March 14, 1967 G. H. BALDING 3,309,659
ELECTRONIC VISUAL CUE INDICATOR SYSTEM FOR AIRCRAFT
Filed Sept. 17, 1964 7 Sheets-Sheet 1

INVENTOR.
GEORGE H. BALDING
BY
ATTORNEYS

March 14, 1967 G. H. BALDING 3,309,659
ELECTRONIC VISUAL CUE INDICATOR SYSTEM FOR AIRCRAFT
Filed Sept. 17, 1964 7 Sheets-Sheet 2

INVENTOR
GEORGE H. BALDING
BY
ATTORNEYS

March 14, 1967 G. H. BALDING 3,309,659
ELECTRONIC VISUAL CUE INDICATOR SYSTEM FOR AIRCRAFT
Filed Sept. 17, 1964 7 Sheets-Sheet 5

March 14, 1967   G. H. BALDING   3,309,659
ELECTRONIC VISUAL CUE INDICATOR SYSTEM FOR AIRCRAFT
Filed Sept. 17, 1964   7 Sheets-Sheet 7

Fig. 12

INVENTOR
GEORGE H. BALDING
BY
ATTORNEYS

United States Patent Office 3,309,659
Patented Mar. 14, 1967

3,309,659
ELECTRONIC VISUAL CUE INDICATOR
SYSTEM FOR AIRCRAFT
George H. Balding, Los Altos, Calif., assignor to the United States of America as represented by the Secretary of the Navy
Filed Sept. 17, 1964, Ser. No. 397,350
5 Claims. (Cl. 340—27)

The present invention relates to electronic circuitry for generating visual cues for indicating the flight condition of an aircraft and more particularly to circuitry for indicating the variation of the aircraft from a programmed path or command heading.

With the advent of high speed aircraft, increasingly complex instrumentation systems for use therein have become necessary. Such instrumentation systems so heavily burden aircraft pilots with routine flight matters as to seriously affect their efficiency in carrying out the specific mission. Thus, it is apparent that a single display system integrating all information concerning aircraft altitude, heading, speed, relative position with respect to target, etc. is vital. At the same time, it is also necessary to present this information in a single integrated display whereby continuous representations of true world conditions are displayed as to enable a pilot to orient the aircraft to its proper flight mode with respect to earth by sole reliance on the artificial display before him. Such a system is disclosed in applications Ser. Nos. 728,019, 16,438 and 244,848 of George H. Balding, filed April 11, 1958, Mar. 21, 1960, and Dec. 14, 1962, respectively, now Patent Nos. 3,093,822, 3,118,128, and 3,170,978 respectively.

In these above-mentioned applications it is illustrated to be electronically feasible to depict on a display screen simulated real world conditions such as ground texture and sky texture. The ground texture generated has a display intensity easily distinguished from a generated cloud texture and the size, motion, and spacing of display elements within the ground texture area are arranged to introduce perspective into the display element presentation. For example, ground texture display elements near the horizon line are presented smaller in size, more closely spaced, and moving slower than ground texture element at the bottom of the display screen. Additionally, the rate of forward motion of these ground texture display elements is shown as a function of aircraft speed modified by aircraft elevation angle. In the prior disclosures position information received from a ballistics computer, altitude data received from an air data computer and azimuth data received from an inertial navigation system are combined by circuits within the display system to permit the visual display of the ground texture elements.

Cloud texture symbols are shown to move when a change in aircraft heading or pitch is taking place and the shape and quantity of these symbols are determined by the pitch angle of the aircraft. Production, size and positioning of these cloud symbols result from receipt of the signals used by the display system in production of ground texture symbols.

Also in the above-mentioned application Ser. No. 728,019, now Patent No. 3,093,822, an aircraft flight path is superimposed upon the ground texture. The flight path is variable as to position, shape, size, etc., to permit the flight direction or programming along any desired path, and has a triangular pattern with the apex thereof at the horizon line and pointed in the relative line or direction of flight of the aircraft.

The present invention contemplates an improved integrated display which includes a flight path of such type superimposed on the texture display, the display being a simulated real world presentation. The flight path display, which as there shown is presented on a television type screen or cathode ray tube, includes a basic flight path and a plurality of command-heading lines. The basic flight path is a transparent path superimposed on the ground texture with the apex of the path moving up and down indicating commands to change altitude and moving left and right indicating steering errors. The base of the path widens to indicate a below-command-altitude condition and moves left or right to indicate that the aircraft is parallel to but to one side of the glide path. According to the present invention, novel means provide a set of command-heading lines along with a flight path of such type, which are comprised of a plurality of dark lines perspectively parallel to the center line of the path which converge at an apex which may be coincident with the apex of the path. When the aircraft is on command heading these lines do not move. If, however, a steering error exists, the command-heading lines rotate around such apex. The direction of rotation of the lines about the apex indicates the direction of the steering error and the rate of rotation provides a rough presentation of the magnitude of the steering error.

The advantage of the present invention over prior art devices is in the provision of novel means for supplying steering error lines as visual indications to the pilot relative to the aircraft heading as an aid to aircraft guidance; and the facilitation thereby of the pilot's control of the aircraft in maintaining a command heading.

It is an object of the present invention to provide electronic circuitry for generating steering-error lines for display on a display screen.

Another object is to provide a plurality of thin steering-error lines which are displayed on a screen and which radiate from the apex of a displayed pathway with equal angular spacing between the lines.

A further object of the present invention is to provide electronic circuitry for generating steering-error lines which are displayed on a screen, which radiate from the apex of a displayed pathway, which remain motionless when the aircraft is flying in a command direction and rotate about the apex when the aircraft is not flying in the commanded direction.

Still another object is to provide electronic circuitry for generating steering-error lines which are displayed on a screen; which radiate from the apex of a pathway display; and which rotate about the apex when the aircraft is not flying in a command direction, the direction of rotation of the lines indicating the direction of the steering error and the rate of rotation providing a rough representation of a magnitude of the steering error.

Other objects and features of the invention will become apparent to those skilled in the art as the disclosure is made in the following detailed description of an embodiment of the invention as illustrated in the accompanying drawing in which.

Figure 1:
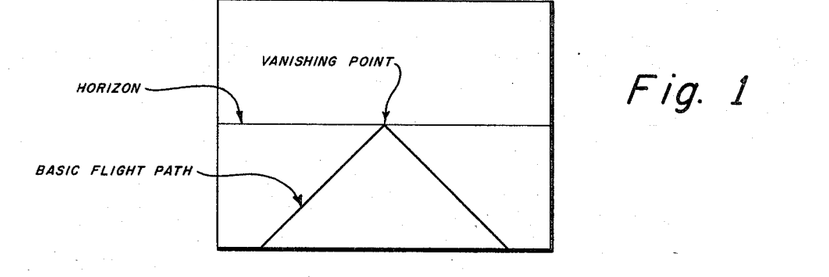
FIG. 1 is a showing of the presentation of the display device with the aircraft at a level, flight-on altitude situation.

Referring to FIGS. 1–4 and in particular to FIG. 1, it can be observed that the nature of the basic path set forth more fully in one or more of the above identified disclosures is triangular in shape. The apex thereof, referred to as the vanishing point, is at the center of the display and its base, referred to as the near end, is located at the bottom of the display. It being understood that a more detailed explanation will be found below, the path is generated in the following manner: first a triangular waveform is generated by integrating the square pulse output of a one-shot multivibrator, which is triggered by a horizontal synchronizer signal via a delay circuit. This successive series of triangular waveforms is then superimposed on a special variable vertical sawtooth waveform. The combined waveform is then passed through a combination clipper-amplifier circuit wherein portions of the combined waveform below a given level are discarded by the clipper-amplifier action, and only the peaks of the triangular waves remain. The width of the base of these clipped triangles becomes shorter as the vertical sawtooth carries the triangle down through the clipping level. The amplitude of the triangles is limited to a common level by this clipper-amplifier. The resultant square pulses are used to gate on the display cathode ray tube for successively shorter intervals as the tube is progressively scanned toward the top. Thus, the basic path is formed.

The special variable vertical sawtooth waveform, mentioned above, on which is superimposed the triangular waveform is known as the path clipper sawtooth. It is essentially a sawtooth generated at a vertical repetition rate, the amplitude, shape, and/or D.C. level of which is modified by an altitude error information factor, the variation of which will result in modification of the path clipper sawtooth which will in turn alter the shape of the basic flight path.

To obtain representation of an aircraft position much higher than the flight path thereby indicating altitude error, the flight path is narrowed by a modification to the clipper sawtooth. The amplitude of the path clipper sawtooth is reduced so that the same number of triangles previously superimposed upon the sawtooth is now superimposed upon a sawtooth that is less steep; the width of successive triangle peaks thus decreases at a slower rate, producing a narrower flight path. See dotted line of FIG. 2.

To obtain representation of an aircraft position lower than that commanded, the flight path is widened and raised at the base of the display. To accomplish this, the amplitude of the path clipper sawtooth is increased so that the triangles previously superimposed upon the sawtooth are now superimposed upon a sawtooth that is steeper, and the width of successive triangle peaks decreases at a higher rate. See solid line of FIG. 2.

Figure 2:
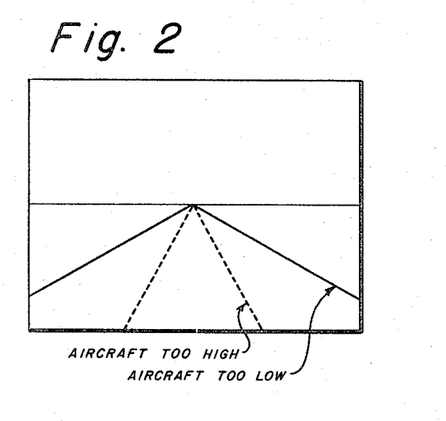
FIG. 2 is a showing of the presentations of the display device with the aircraft at a relatively high altitude (dotted line) and with the aircraft at a relatively low altitude (solid line)
Figure 2A:
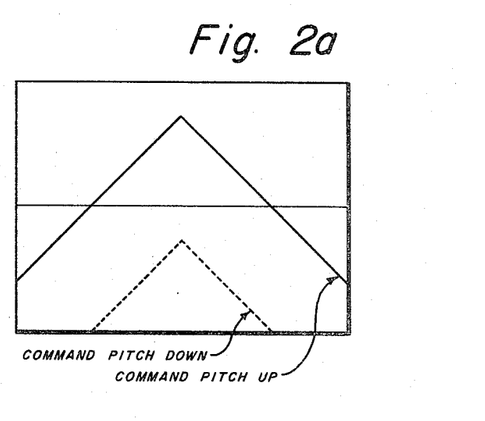
FIG. 2a is a showing of the presentations of the display device when the aircraft is commanded to pull up (solid line) or pitch down (dotted line) to achieve the desired predetermined path or target.

The vanishing point position on the screen may also be made to vary vertically. This positioning is accomplished by varying the D.C. level of the path clipper sawtooth by displacing vertically the keyed clamping pulse which establishes this level. Moving the clamping point down will cause a lower D.C. level sawtooth, resulting in a downward motion of the vanishing point and conversely moving it up will cause a higher D.C. level on the sawtooth which results in the upward motion of the vanishing point. Since the amplitude of the vertical sawtooth remains constant, the entire path executes this vertical displacement without changing shape. This indication on the display is seen in FIG. 2a.

Other changes may be introduced into the flight path by varying the delay by which the horizontal timing of the triangles with respect to horizontal sync is established. Varying this delay varies the horizontal position of the path. The horizontal position is modified in this way by the following factors: (a) heading error information, (b) command horizontal position information.

Referring now to the heading error information (far turn), a heading error sawtooth creates a lateral shift in the apex (vanishing point) of the triangular shaped path which is proportional to the heading error bias voltage. This heading error is generated on the screen by modulating the path lateral position with a negative or positive going vertical sawtooth (far turn sawtooth) depending on which side of the screen the vanishing point is to be moved. The amplitude of this modulating voltage will determine the distance from which the vanishing point will deviate from the center of the screen. See FIG. 3.

Referring now to command horizontal position information (near turn), note that by modulating the path lateral position circuit the near end of the path may be shifted laterally; therefore, by clamping the vertical sawtooth at a point corresponding to the vanishing point of the path, the path will execute near turn to the left or right depending once again on the polarity of the modulating sawtooth (near turn sawtooth). See FIG. 4.

Figure 5:
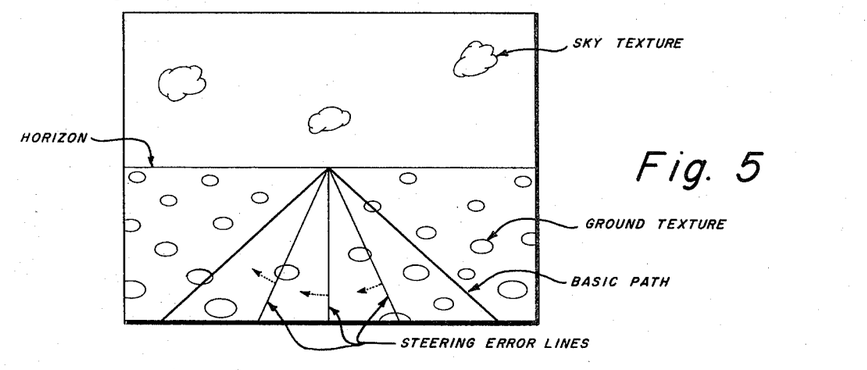
FIG. 5 is a showing of the presentation of the display device illustrating the sky and ground texture and with the aircraft parallel to and at the right of the predetermined path; with the command heading lines rotating right to left.
Figure 6:
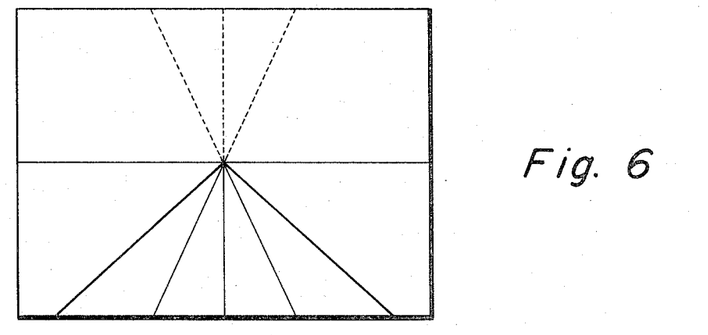
FIG. 6 is a showing of the presentation of the display device with the aircraft on the commanded predetermined flight path.
Figure 7:
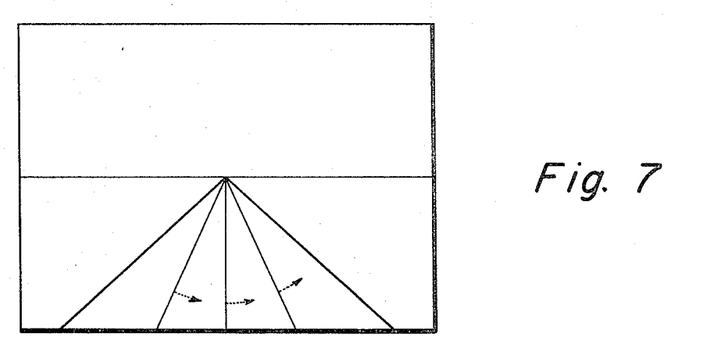
FIG. 7 is a showing of the presentation of the display device similar to FIGS. 5 and 6 with the aircraft parallel to and at the left of the commanded predetermined path; with the command heading lines rotating left to right.

Referring now to an embodiment of the present invention, FIGS. 5, 6 and 7, illustrate a visual display or presentation including a sky pattern, a horizon and a ground texture which relate to true visual conditions along with a flight path superposed thereon. The ground pattern presentation is in a form to provide a random texture for permitting extended viewing without eye fatigue and, further, true world conditions are more accurately represented since the distance between successive elements or symbols in each row of ground texture symbols are caused to diminish at locations which are closer to the horizon, and the speed of the elements are caused to increase in their progression from the horizon in the direction of the lower marginal edge of the display. Therefore the displacement of the ground symbols relative to each other on different portions of the pattern at different distances provide the effect of motion perspective. The circuitry for accomplishing the above features is adequately described and disclosed in application Serial No. 16,438 of George H. Balding, filed March 21, 1960. As indicated above, the basic display also includes a flight path, such as set forth in one or more of the above identified applications, which is generated and superimposed on the above-mentioned visual cues to permit the flight direction or programming along any desired path. In the present invention, to further aid a pilot in following the path, the path being used to provide for landing an aircraft under blind landing conditions or for a preferred path of attack and retreat against enemy targets, a series of steering-error lines are superimposed upon the flight path to provide sensitive heading error indications. As illustrated in FIG. 6, the steering-error lines, if motionless, indicate that the aircraft is flying in the commanded direction. In FIG. 5 the steering-error lines are rotating about the apex of the flight path in a right-to-left direction indicating that the aircraft is flying to the right of the target or that the target is to the left of the aircraft and that the pilot must negotiate a banking or turning movement in that direction to correct the error. In FIG. 7 the steering-error lines are rotating about the apex in a left-to-right direction indicating that the aircraft is to the left of the target and that the pilot must navigate to the right to fly in the commanded direction. As will be more readily seen below, four steering error lines are generated but only three are visible at any one time. The fourth is always off the flight path and blanked out. See FIG. 6.

Figure 8:
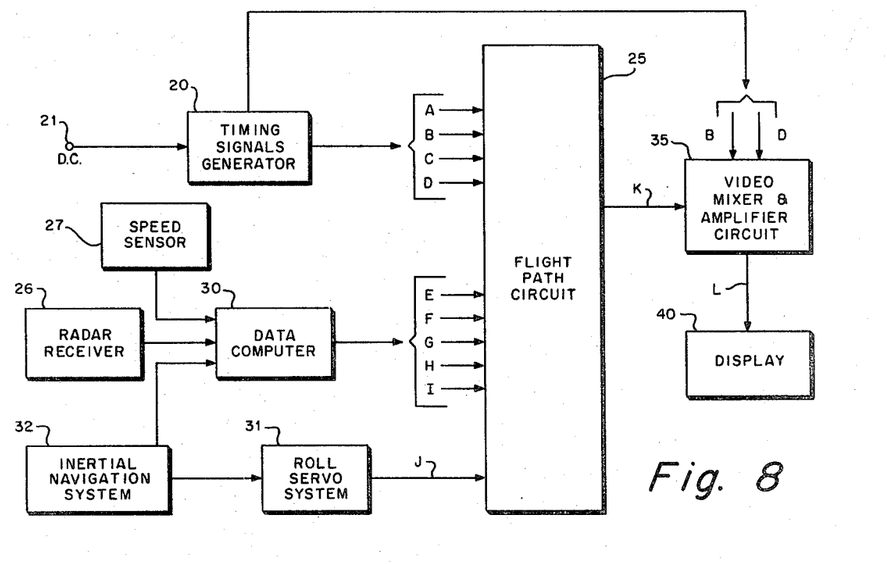
FIG. 8 illustrates, in block representation, the component parts of the novel display system.

Referring to FIG. 8, in order to accomplish the characteristics indicated above relative to the flight path and the steering-error lines, the present invention contemplates the use of a timing signals generator 20 being supplied with an appropriate source of power 21 from an aircraft or the like and in turn supplying signals A, B, C and D to a flight path circuit 25. Signal A represents a vertical sync pulse, signal B a horizontal sync pulse, signal C a horizontal sawtooth, and D a vertical sawtooth.

Figure 3:
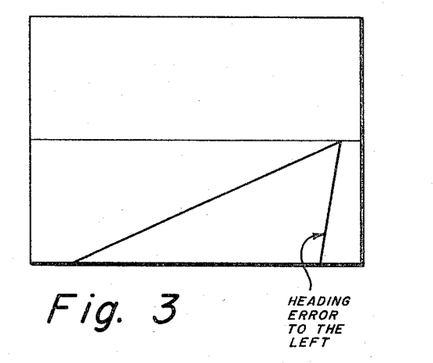
FIG. 3 is a showing of a presentation of the display device with the aircraft on the path and heading to the left of the desired flight path or target.
Figure 4:
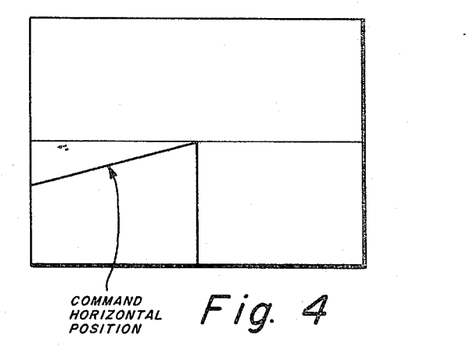
FIG. 4 is a showing of an alternate presentation of the display device with the aircraft parallel to and at the right of the desired path or target.

As indicated in FIGS. 1–4, the path may be adjusted to different shapes and to different positions on the screen. Thus, for example, in the use of the equipment in a ballistic delivery system, the flight path may be positioned as shown in FIG. 4 to show deviation of the aircraft to the right of the proper approach path. The equipment operable to detect enemy targets and for subsequently adjusting the shape of the flight path includes radar receiving equipment such as the illustrated unit 26, which is operative to receive the signal output of radar transmitting equipment not shown, in combination with a data computer 30 which is controlled in its operation by such signals and operative to compute a preferred path of attack and retreat, and to feed such path into the flight path control circuit 25. An example of one of the many known data computers which may be utilized is the U.S. Navy Ballistics Computer Set AN/ASQ–61. In addition to the receipt of radar information, the data computer 30 receives present-position information from the doppler-inertial navigation system 32, air speed information from speed sensor 27, and subsequently provides output or error signals E, F, G, H and I which are fed to the flight path circuit 25 for controlling and adjusting the shape of the flight path as described above. The inertial navigation system used may be one of the many systems known in the art for the purpose described and may be, for example, the U.S. AN/ASN–31 system.

Output signals E and H are the error signals provided by the data computer 30 for establishing the vertical and horizontal positions, respectively, of the vanishing point or apex of the path while signals F and G are the error signals provided by the computer 30 for adjusting the basic path presentation to indicate a command to the pilot to change the aircraft's altitude or horizontal position, respectively. Signal I from the computer is indicative of the magnitude of the steering error and determines the rate that the command heading lines or steering-error lines rotate about the apex or vanishing point.

As will be seen, the output signals E–I are fed to the flight path circuitry 25: to effect a corresponding adjustment of the path position and a flight path of any desired shape. Ostensibly the system is also readily adapted for use with blind landing installations (ILS) and the flight path may be positioned as shown in FIG. 2 to show deviation of the aircraft above or below the proper approach path, and as shown in FIG. 3, to show deviation of the aircraft to the left of the proper approach path. Other similar applications will be apparent to parties skilled in the art.

A further input to the flight path circuit 25 is a path inversion relay signal J provided as an output from a roll servo system 31 which in turn receives input signals from the inertial navigation system 32 indicative of the pitch and azimuth of the aircraft. A video mixer and amplifying circuit 35 receives the output signal K from the flight path circuit 25 and horizontal sync and vertical sawtooth signals B and D, respectively, from the timing signals generator 20 and applies the output L thereof to a video display 40 which may be a cathode ray tube or the like.

Figure 9:
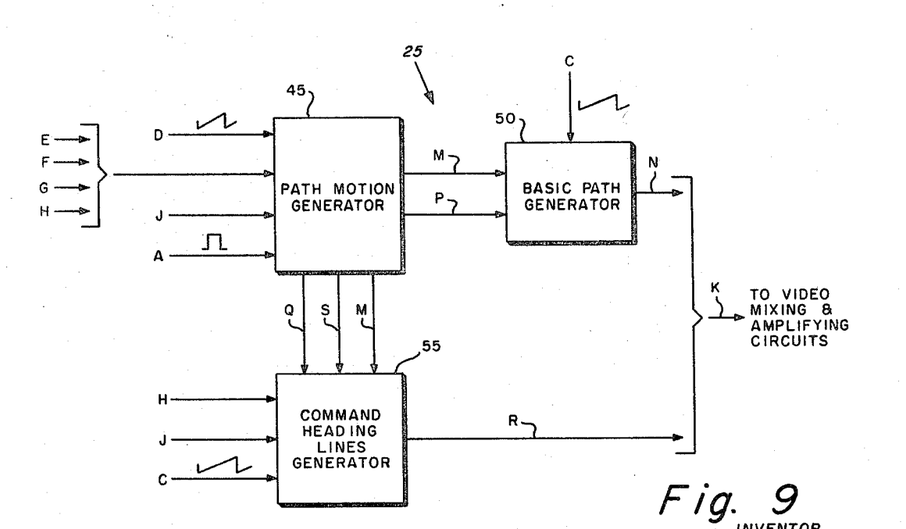
FIG. 9 illustrates the block diagram of the flight path circuit of FIG. 8.

The block diagram of the flight path control circuit 25 is illustrated in FIG. 9 and includes a path motion generator 45 which develops the signals that cause the basic path to pitch up or down (FIG. 2a) and have near-and-far turn motion (FIGS. 4 and 3). The path motion generator 45, which will be more thoroughly described below in connection with FIG. 10, receives input signals E, F. G and H from the computer 30, A and D from the timing generator 20 and J from the roll servo system 31.

Figure 10:
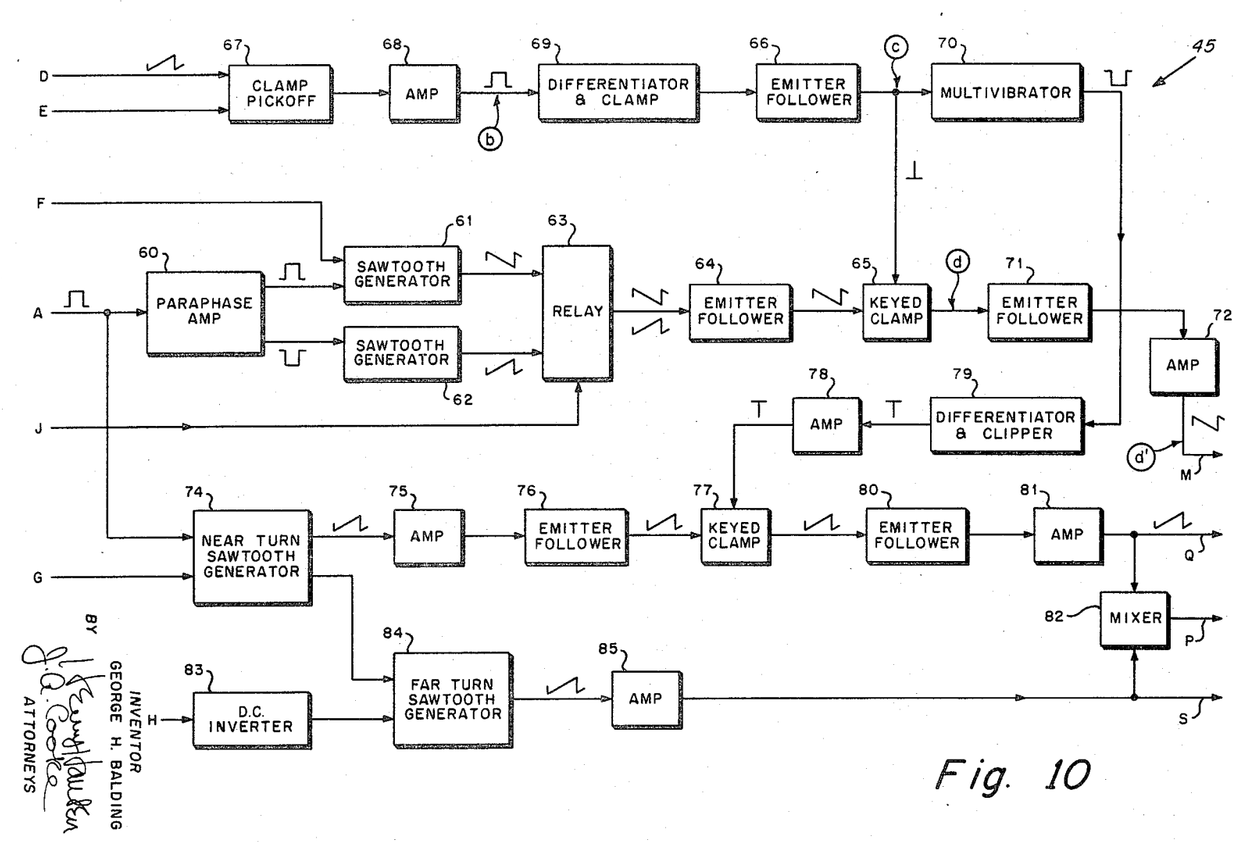
FIG. 10 illustrates the block diagram of the path motion generator of FIG. 9.

With reference to FIG. 9, which illustrates the flight path circuit 25 of FIG. 8 in block representation, a path-motion generator 45 to be more fully described below with reference to FIG. 10 is shown as providing an output signal M which is the path-clipper sawtooth signal and supplying the same to a basic-path generator 50 and to a command-heading-lines generator 55. Additionally, generator 45 supplies a path-motion sawtooth signal P to the basic-path generator 50 and signals Q and S which are command-horizontal-position sawtooth and vanishing point horizontal-position sawtooth waves, respectively, to the command-heading-lines generator 55.

The basic-path generator 50 which will be more clearly described below in connection with FIG. 11 receives input signals M and P from the path-motion generator 45 and additionally receives as an input the horizontal sawtooth C from the timing signals generator 20. The output signal N from the basic-path generator is subsequently combined with the output R from the command-heading generator 55 and provides the input K to the video mixing and amplifying circuits. The command-heading-lines generator 55, in addition to receiving signals Q, S and M from the path-motion generator 45, have applied thereto the horizontal sawtooth C from the timing signals generator 20, the path inversion relay signal J and signal I which is the command-heading-lines rate control signal from the data computer 30. The output signal R from the command-heading-lines generator is combined with output signal N from the basic-path generator 50 and form the input K to the video mixing and amplifying circuits 35 for subsequent transmission to the display device 40.

Referring now to FIG. 10 for a block diagram of the path-motion generator 45, the vertical-synchronization signal A from the timing generator circuits 20 is applied to paraphrase amplifier 60. The negative pulse output of amplifier 60 is applied to path-sawtooth generator 61 and the positive output is applied to inverted path-sawtooth generator 62.

In addition to the vertical synchronization, the path-sawtooth generator 61 receives the command-altitude-change signal F from data computer 30. The path-sawtooth generator 61 delivers a negative-going sawtooth that is synchronized to the vertical synchronization, and whose slope or amplitude corresponds to the value of the command-altitude-change signal F.

The inverted path-sawtooth generator 62 delivers a positive-going sawtooth that is also synchronized with the vertical synchronization signal A, but the amplitude of this saw tooth is fixed and does not vary as a function of the command-altitude-change signal F.

The positive- and negative-going sawtooth waveforms from the path-sawtooth generators 61 and 62 are applied to relay 63. Normally this relay applies the negative-going sawtooth to emitter followers 64; however, when the path-inversion relay signal J from the roll servo system 31 is present, the positive-going sawtooth is applied to the emitter follower 64. The output of the emitter follower 64 is applied to keyed clamp 65. The keyed clamp receives a clamping pulse from emitter follower 66. The point along the sawtooth at which the clamping pulse occurs is clamped to ground; that is, if the clamping pulse occurs at the center of the sawtooth, the first half of the sawtooth will be all positive and the last half of the sawtooth will be negative; thus, the clamping pulse determines the point which the zero voltage axis crosses the sawtooth. See line d of FIG. 10a. The clamping pulse is derived in the following manner: the vertical sawtooth D from the timing circuits 20 and the vanishing-point vertical-position signal E from the data computer 30 are applied to a pickoff 67, the pickoff circuit generating an output pulse the leading edge of which occurs at some point during the time of the vertical sawtooth D; this point is determined by the value of the vanishing-point vertical-position signal E. See line a of FIG. 10a. The pickoff output pulse is applied through amplifier 68 to a differentiating and clamping circuit 69. See line b of FIG. 10a. A positive leading edge is applied through emitter follower 66 to the keyed clamp 65 and to a one-shot multi-vibrator 70.

Figure 10A:
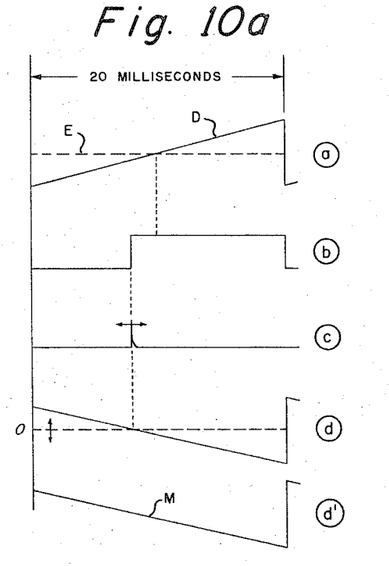
FIGS. 10a and 10b illustrate the waveform timing diagram of the path motion generator of FIG. 10.

The output of the keyed clamp 65 is applied through emitter follower 71 to quasi-complementary amplifier 72. The sawtooth output (line d') of the quasi-complementary amplifier 72 is applied as path-clipper sawtooth M to the command-heading-lines generator 55 which is part of the flight path circuit 25. It should be noted that the path-clipper sawtooth M is variable in two ways: in slope or amplitude, which is determined by the command-altitude-change signal F applied to the path sawtooth generator 61; and in D.C. level, which is determined by the point along the sawtooth slope at which the clamping pulse occurs (or the value of the vanishing-point vertical-position signal E applied to the clamp pickoff circuit 67). With reference to FIGS. 10 and 10a, it is seen that right and left shift of the output pulse of emitter follower 66 (line c) results in up and down shift is zero-crossover point of sawtooth (line d).

Near-turn sawtooth generator 74 receives the vertical-synchronization signal A from the signal generator circuit 20, and the command-horizontal-position signal G from the data computer 30. The vertical-synchronization signay A initiates the sawtooth output and the command-horizontal-position signal G determines the slope or amplitude of the sawtooth. The sawtooth output is applied to quasi-complementary amplifier 75, and the quasi-complementary amplifier 75 applies the sawtooth to the emitter follower 76 which, in turn, applies the sawtooth to keyed clamp 77.

The keyed clamp 77 also receives a clamping signal from amplifier 78. This signal is originally derived from the clamping signal applied to keyed clamp 65; the original clamping signal triggers an output pulse from one-shot multivibrator 70; the output of the multivibrator 70 is differentiated and the positive trailing-edge pulse is clipped by the differentiating and clipping circuit 79; and the negative leading-edge pulse is applied through amplifier 78 to keyed clamp 77 as the clamping signal. The output of the keyed clamp 77 is applied through emitter follower 80 to quasi-complementary amplifier 81. The quasi-complementary amplifier 81 applies its output to the command-heading-lines generator 55 as the command-horizontal-position sawtooth Q, and also the mixer 82.

Figure 10B:
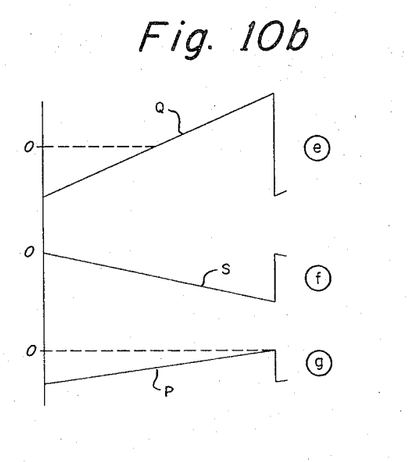

The vanisihng-point horizontal-position signal H from the data computer 30 is inverted by a D.C. inverter 83 and applied to far-turn sawtooth generator 84. The far-turn sawtooth generator 84 also receives a normal and an inverted vertical-synchronization signal from the near-turn sawtooth generator 74. These signals initiate the sawtooth output of the far-turn sawtooth generator 84. The slope, or amplitude, of the sawtooth is determined by the value of the vanishing-point horizontal-position signal H from the D.C. inverter 83. The sawtooth output is applied to quasi-complementary amplifier 85 and the amplifier applies its output to the command-heading-lines generator 55 as the vanishing-point horizontal-position sawtooth S; and to mixer 82. Mixer 82 combines the command-horizontal-position and vanishing-point horizontal-position sawtooth waveforms Q and S as can be seen in FIG. 10b and the resultant sawtooth is applied to the basic path generator 50 as the path-motion sawtooth P.

Figure 11:
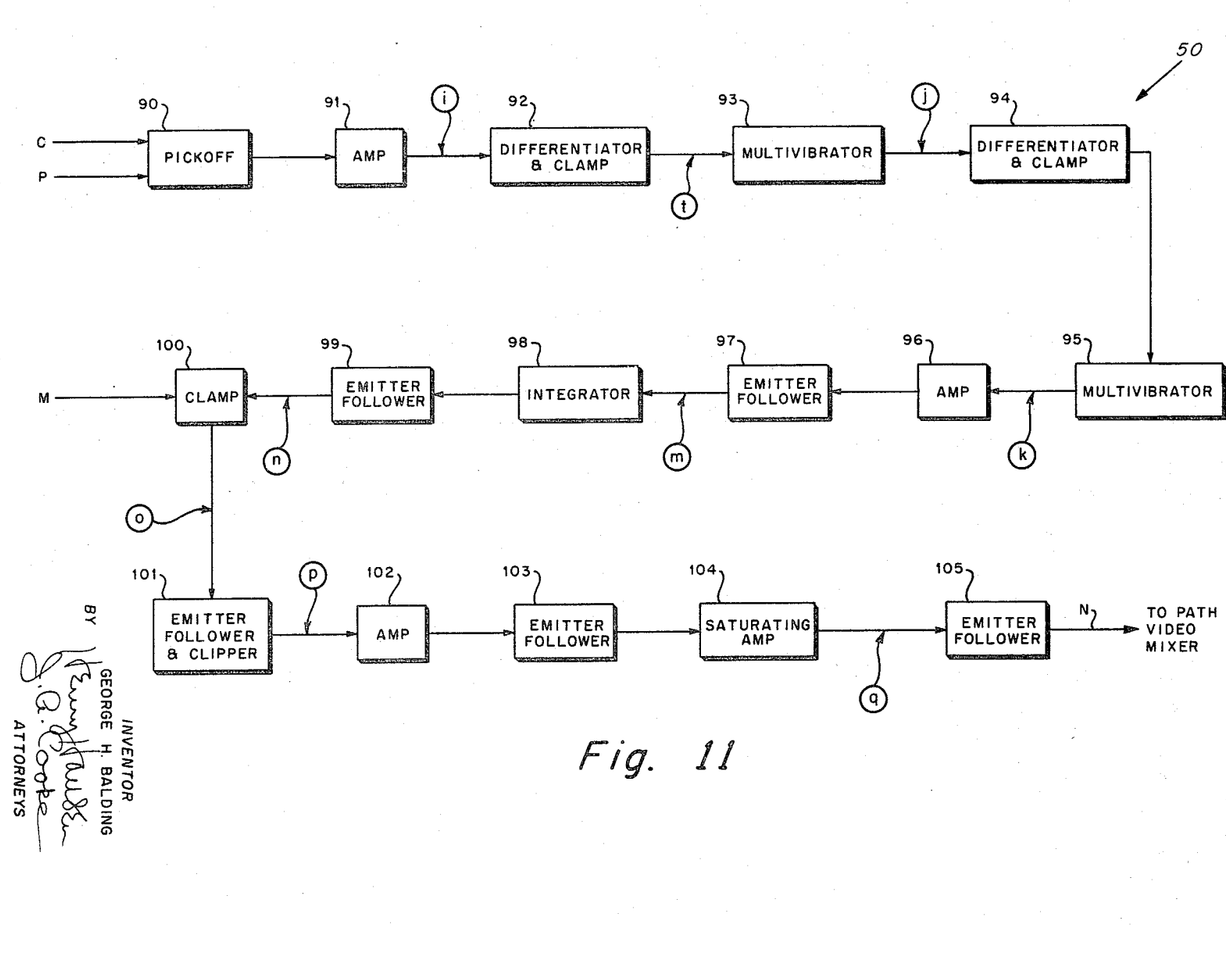
FIG. 11 illustrates the block diagram of the basic path generator of FIG. 9.
Figure 11A:
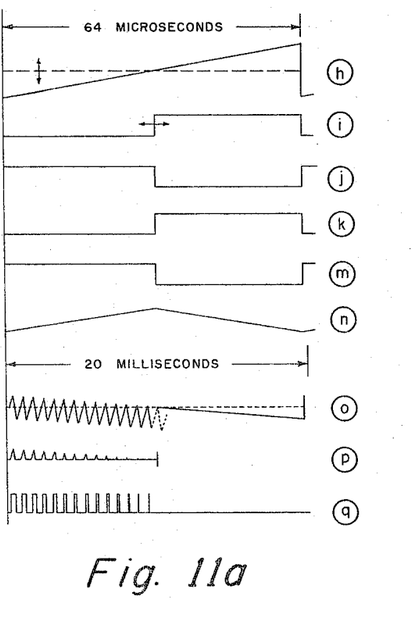
FIGS. 11a and 11b illustrate the waveform timing diagram of the basic path generator of FIG. 11.
Figure 11B:
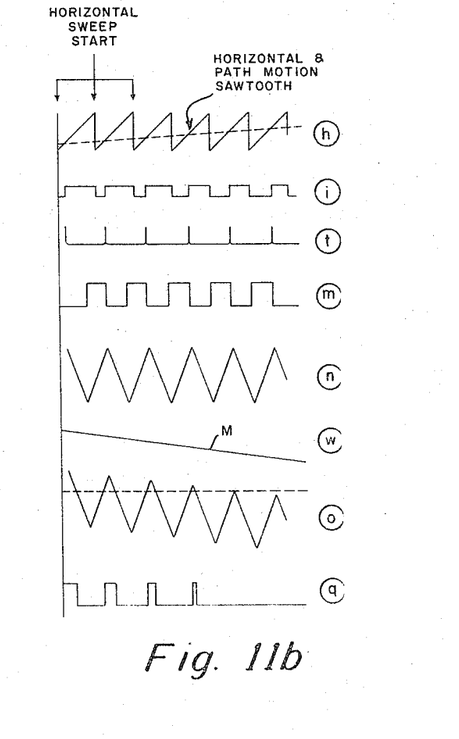

Referring now to the basic path generator 50 and to FIGS. 11, 11a and 11b in particular, a pickoff circuit 90 receives the horizontal sawtooth C from the timing generator 20 and also receives the path-motion sawtooth (vertical rate) P from the path-motion generator 45 (see lines h of FIG. 11a and FIG. 11b). The pickoff circuit 90 generates an output pulse, the leading edge of which occurs at some point during the time of the horizontal sawtooth C; this point is normally at the center of the horizontal sawtooth C but the pickoff point is shifted if a path-motion sawtooth P is present. The waveforms, lines h of FIGS. 11a and 11b, respectively, illustrate this effect. The pickoff-circuit output pulse is applied through amplifier 91 to differentiating and clamping circuit 92 (see line i of FIGS. 11a and 11b) with positive leading-edge output of the differentiator and clamp being applied to one-shot multivibrator 93, triggering the one-shot (line j). The square-wave output of the triggered one-shot multivibrator 93 is differentiated and clamped by circuit 94, and the positive leading-edge pulse triggers one-shot multivibrator 95. The square-wave output (line k) of this one-shot multivibrator 95 is applied to amplifier 96. Amplifier 96 applies an inverted basic-path square-wave (line m) to emitter follower circuit 97 which, in turn, applies the square-wave to intergrator 98. Integration of the basic-path square-wave results in a triangular waveform which is applied through emitter follower 99 to clamping circuit 100 (line n of FIGS. 11a and 11b illustrates the triangular output of emitter follower 99). The path-clipper sawtooth M from the path-motion generator 45 is also applied to clamping circuit 100 and the two signals are clamped and applied (line o) to emitter followers and clipper 101. The clipped output of circuit (line p) is then applied through amplifier 102 and emitter follower circuit 103 to saturating amplifier 104. The signal is amplified and top clipped at these stages, and pulses of varying width but constant height are produced at the output of saturating amplifier 104. (See line q of FIGS. 11a and 11b). The widest pulse corresponds to the base of the path and the shortest pulse corresponds to the apex of the path. Emitter follower 105 applies the pulses to the path video mixer as the basic-path signal N.

FIG. 11b also illustrates the waveform timing of the basic-path generator 50. Note in this figure that when a path-motion sawtooth P is present, the pickoff output pulse does not occur at the same point in successive horizontal sawtooths. The bottom waveform (line y) illustrates the effect of this: each successive pulse output of saturating amplifier 104 occurs later (with respect to the horizontal-synchronization pulse) than the preceding pulse; hence, the path apex is pulled to the right side of the display; conversely, if the path-motion sawtooth P is negative-going, each successive output pulse of saturating amplifier 104 occurs earlier than the preceding pulse and the path base is pulled to the left. By alterning the slope and D.C. level of the path-motion sawtooth P, the path base or apex can be moved left or right.

FIG. 11b also illustrates the effect of the path-clipper sawtooth M. The slope of the path-clipper sawtooth M determines how many horizontal triangles are top and bottom clipped, and consequently determines how many pulses appear at the output of saturating amplifier 104 during the course of the vertical sweep. Decreasing or increasing the slope of the path-clipper sawtooth M, therefore, moves the path apex up or down respectively.

Figure 12:
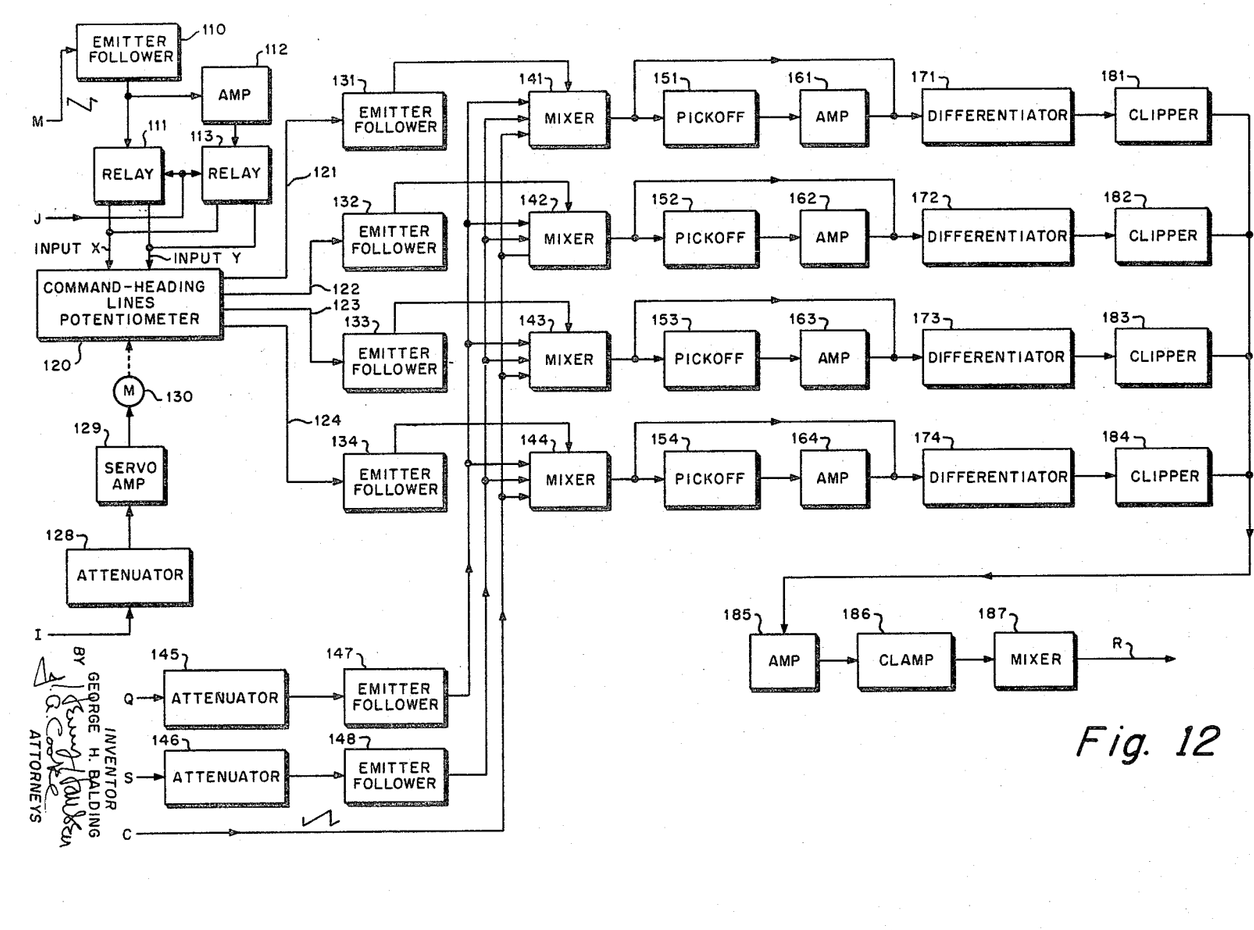
FIG. 12 illustrates the block diagram of the command-heading lines generator of FIG. 9.

Referring now to a description of the command-heading-lines generator 55 and more particularly to FIG. 12, the path-clipper sawtooth M from the path-motion generator 45 is applied to emitter follower 110, the output of which is applied to two points; to relay 111, and to amplifier 112. The inverted output of amplifier 112 is then applied to relay 113. Normally, relay 111 applies the normal signal to input X of the command-heading-lines potentiometer 120 and relay 113 applies the inverted signal to input Y of the potentiometer 120. When the path inversion relay signal J from the roll servo system 31 is applied to the relays 111 and 113, however, the normal signal is applied to input Y and the inverted signal is applied to input X. This results in the command-heading-lines reversing the position of the vertical display 40.

The command-heading-lines potentiometer 120 has four separate wipers 121–124; thus, four different output voltages are taken from the potentiometer 120. When the four wipers are stationary, the four output voltages vary as a function of the two input signals applied to inputs X and Y; however, when a command-heading-lines-rate signal I is applied from data computer 30 to attenuator 128 the servo amplifier 129 and associated motor 130 rotate the potentiometer wipers 121–124 at a rate and direction determined by the amplitude and polarity of the command-heading-lines rate signal I. This results in rotation of the command-heading-lines on the display 40. The output voltage from each of the four potentiometer wipers 121–124 is applied to an emitter follower 131–134, respectively.

The processing for each wiper output is identical, consequently only the signal path for wiper 121 is described herein; the output from emitter follower 131 is applied to mixer 141. In the mixer 141, the output signal from wiper 121 is combined with the horizontal sawtooth C from the timing signals generator 20 and the command-horizontal-position sawtooth Q and vanishing-point vertical-position sawtooth S from the path-motion generator 45. The latter sawtooth waveforms Q and S are coupled through attenuators 145 and 146, respectively, and the emitter followers 147 and 148, respectively. The composite output of the mixer 141 is applied to pickoff 151. The pickoff circuit 151 generates an output pulse, the leading edge of which occurs at some point during the time of each horizontal sawtooth; this point is determined by the value of the output signal from wiper 121. Normally the pickoff point occurs slightly earlier or later (depending on which command-heading line is being generated) during each successive horizontal sawtooth to obtain the slanting effect of the command-heading lines as viewed on the display 40. However, the combination of the command-horizontal-position sawtooth Q and the vanishing-point vertical-position sawtooth S form another sawtooth that is similar to the path-motion sawtooth D described above. Since this sawtooth occurs at the vertical sweep rate (approximately 312 times longer than the horizontal rate), the pickoff point is shifted slightly more or less during each successive horizontal sawtooth, depending on the slope and D.C. level of this quasi-path-motion sawtooth. This causes the command-heading lines to shift in accordance with the basic path when a near-turn or far-turn command is being displayed.

The pulse output of pickoff 151 is applied to amplifier 161 and this amplifier applies its output to two points: to pickoff 151 as positive feedback to improve the wave shape of the pickoff output, and to differentiator 171. Clipper 181 passes only the positive pulse output of the differentiator 171 and this pulse is applied to amplifier 185 which in turn applies the command-heading-line pulses through clamp 186 to the mixer 187. The command-heading-lines output R from mixer 187 is applied to the video mixing and amplifying circuitry 135 for application to the display 40 for visual readout thereof.

In summary, it is seen that when the aircraft is off course a heading-error signal I is produced, which causes rotation of the command-heading-lines potentiometer 120. The potentiometer in turn causes rotation of the command-heading-lines on the display 40. When the pilot brings the aircraft on course the error signal I goes to zero causing the command-heading-lines to cease rotation.

It has been set forth hereinbefore, a novel electronic, visual cue generator device which is operative to provide visual cues for facilitating the presentation of different forms of information on an electronic display device.

In one specific embodiment disclosed herein the electronic visual cue generator device provides a plurality of novel command-heading or steering-error lines in superposed relation with a flight path which in turn is in a superposed relation with respect to background cues. These cues comprise sky texture symbols, a horizon, and ground texture symbols which are animated and represent changes in the pitch, altitude, azimuth, roll and speed of the aircraft. This latter group of symbols including the flight path is described in application Serial No. 728,019 of George H. Balding, filed April 11, 1958. The total arrangement is utilized in the presentation of information relating to the flight condition of an aircraft and with the addition of the steering-error lines, which indicate the variation of the aircraft from a programmed path or command heading, an unparalleled amount of information is presented in a single integrated display.

While such an arrangement has particular utility in aircraft units, it will be apparent to parties skilled in the art that similar advantages may be obtained in the use of the equipment in numerous other applications, including submarines, tanks, ships, missiles and torpedo guidance, automobiles, simulator units and other types of equipment.

The flight path and steering error lines set forth in the foregoing description may, for example, be utilized as a guide path for tanks or submarines through a mine field, or as an aid in the guidance of a missile toward a desired target or a driverless industrial truck through a factory or many other similar applications.

Obviously, many modifications and variations of the present invention are possible in the light of the above teachings. It is, therefore, to be understood that within the scope of the appended claims the invention may be practiced otherwise than as specifically described.

What is claimed is:

1. In a visual indicator system for displaying different items of information on a display unit relating to the movement of an object relative to true world conditions including a first cue generator circuit operative to generate a first group of signals for coupling to said display device to provide a first cue set comprising a sky, a horizon, and a ground portion on the display unit and further including a second cue generator circuit operative to generate a second group of signals for coupling to said display device having waveforms of a shape to provide a display of a cue set thereon consisting of triangular path extending across at least a portion of the display, and further including a path control means including a path-end positioning circuit means operative to provide signals for adjusting signal output of the second generator circuit to adjust the apex of the path on the display unit to different horizontal and vertical coordinate positions, the path control means having a generator means for generating signals of different characteristics to adjust the path outline to widths of corresponding different values, and further including means for coupling the output of said path control means to said display unit, the improvement comprising: an additional generator means for generating a set of signals of a waveform to establish a plurality of lines perspectively parallel to the path, which rotate about the apex thereof at a rate related to the heading error of the object relative to a predetermined path, and which rotate in a direction indicative of the direction of the error, and means for coupling said set of signals to the display unit for display thereon.

2. The visual indicator system of claim 1 wherein said additional generator means includes: potentiometer means including a plurality of separaate wipers, means connected to a source of sawtooth signals operative to couple sawtooth signals to variable amplitude and D.-C. level to said potentiometer means, means generating an error signal of amplitude and polarity indicative of the position of the object with respect to a predetermined position, servo means receiving said error signal and operatively coupled to said potentiometer means for rotating said potentiometer wipers at a rate and direction determined by the amplitude and polarity of said error signal, and circuit means receiving the output voltage of said potentiometer wipers and having as an output thereof a set of signals of a waveform to establish a plurality of lines corresponding to the number of wipers and perspectively parallel to the path and which rotate about the apex thereof at a rate and direction indicative of said error signal.

3. The visual indicator system of claim 2 wherein said potentiometer means includes four wipers spaced 90 degrees apart.

4. The visual indicator system of claim 2 wherein said circuit means for providing said lines includes: a corresponding plurality of variable delay circuit means each receiving the voltage output of one of said wipers, means connected to a source of horizontal sawtooth signals to couple sawtooth signals to said variable delay circuit means, whereby the potentiometer voltage determines the time on the horizontal wave from which a pulse is picked off in the delay circuit, and means receiving the outputs from said variable delay circuits for mixing and amplifying the same and for providing a set of output signals.

5. The visual indicator system of claim 2 wherein said circuit means for providing said lines includes: an emitter follower circuit receiving the output voltage from each of said potentiometer wipers, a mixing circuit, means connected to a source of horizontal sawtooth signals operative to couple horizontal sawtooth signals to said mixing circuit, said mixing circuit combining said output signal from said emitter follower circuit with said horizontal sawtooth signal, a pickoff circuit receiving the composite output of said mixer and generating an output pulse, the leading edge of which occurs at a point during the time of each horizontal sawtooth dependent upon the value of said potentiometer wiper signal, a first amplifier circuit receiving the output of said pickoff circuit and amplifying the same, a differentiator circuit coupled to said amplifier circuit and differentiating the amplified signal, a second amplifier circuit, a clipper circuit receiving the differentiated signal and passing the positive pulse output thereof to said second amplifier circuit, a clamping and clipping circuit receiving the output of the second amplifier circuit and providing a set of signals for coupling to the display unit.

References Cited by the Applicant

UNITED STATES PATENTS

| 2,262,245 | 11/1941 | Moseley et al. |
| 2,838,602 | 6/1958 | Sprick. |
| 2,903,615 | 9/1959 | Hoffmann. |
| 2,938,949 | 5/1960 | Vosburgh et al. |
| 2,989,702 | 6/1961 | White. |

NEIL C. READ, *Primary Examiner.*

A. H. WARING, *Assistant Examiner.*